United States Patent [19]

Bardot

[11] Patent Number: 4,786,464

[45] Date of Patent: Nov. 22, 1988

[54] COVER PLUG OF THE CORE OF A FAST NEUTRON NUCLEAR REACTOR

[75] Inventor: Alain Bardot, Villers sur-Orge, France

[73] Assignee: Novatome, Courbevoie, France

[21] Appl. No.: 46,008

[22] Filed: May 5, 1987

[30] Foreign Application Priority Data

May 5, 1986 [FR] France .................. 86 06476

[51] Int. Cl.$^4$ ............... G21C 15/00; G21C 11/00
[52] U.S. Cl. ................................. 376/352; 376/290; 376/285; 376/353; 376/399
[58] Field of Search ............ 376/352, 353, 285, 290, 376/399, 461

[56] References Cited

U.S. PATENT DOCUMENTS

| | | | |
|---|---|---|---|
| 4,293,383 | 10/1981 | Lakra et al. | 376/352 |
| 4,309,252 | 1/1982 | Gilroy | 376/290 |
| 4,639,350 | 1/1987 | Malaval | 376/353 |
| 4,652,425 | 3/1987 | Ferrari et al. | 376/352 |

FOREIGN PATENT DOCUMENTS

| | | |
|---|---|---|
| 0108691 | 5/1984 | European Pat. Off. |
| 0127540 | 12/1984 | European Pat. Off. |
| 0160603 | 11/1985 | European Pat. Off. |
| 2289031 | 5/1976 | France |
| 0128481 | 7/1984 | Japan .................. 376/290 |
| 1497755 | 1/1978 | United Kingdom .............. 376/399 |

OTHER PUBLICATIONS

*Nuclear Fuel Elements*, 1982, p. 244, by B. Frost, Pergamon Press.

*Primary Examiner*—Harvey E. Behrend
*Attorney, Agent, or Firm*—Pollock, Vande Sande & Priddy

[57] ABSTRACT

The cover plug (4) comprises a cylindrical barrel (8), a support plate (10), a group of vertical tubes (12) for the control rods and for the instrumentation of the core, an apertured transverse plate (28) fixed to the lower end of the barrel (8) and a transverse deflection plate (32) located above the apertured plate (28). The transverse deflection plate (32) is suspended from the barrel (8) by substantially vertical elastically yieldable strips (34) evenly spaced apart on the periphery of the barrel (8). The strips (34) are welded to the barrel (8) by their upper end and to the edge of the deflection plate (32) by their lower end. They are located in the region of openings (35) in the barrel (8) which permit radial movement of the deflection plate. The deflection plate (32) is also integral with tubes (14b) receiving the control rods disposed in a single row coaxial with the barrel (8).

5 Claims, 2 Drawing Sheets

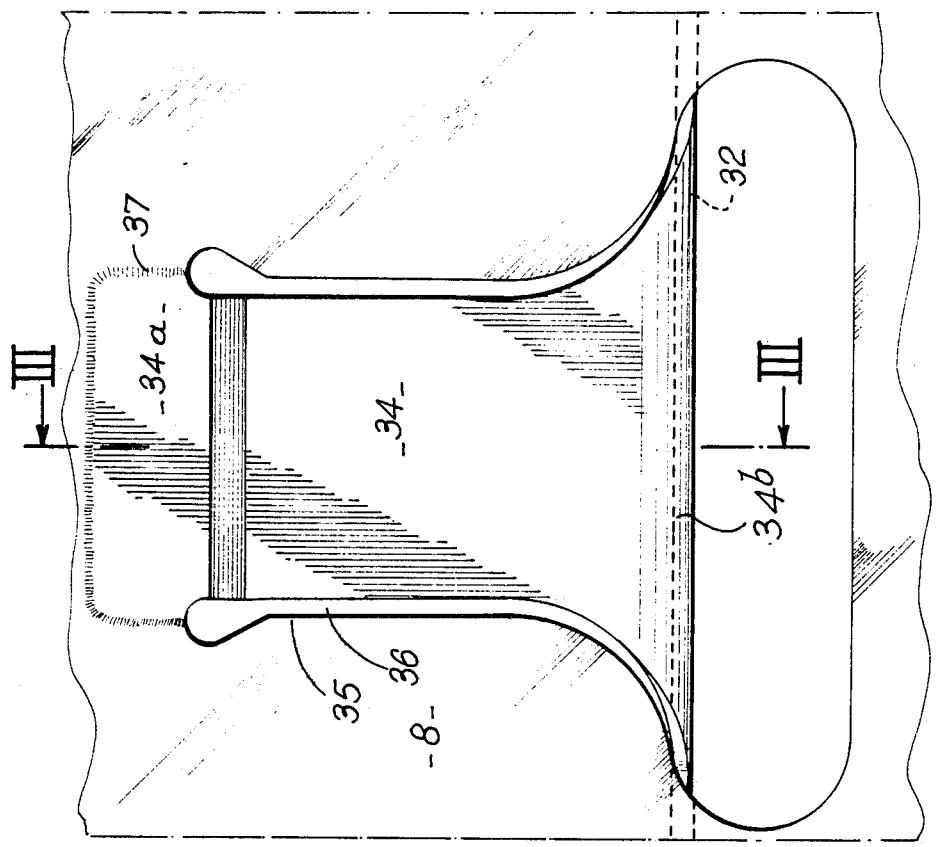
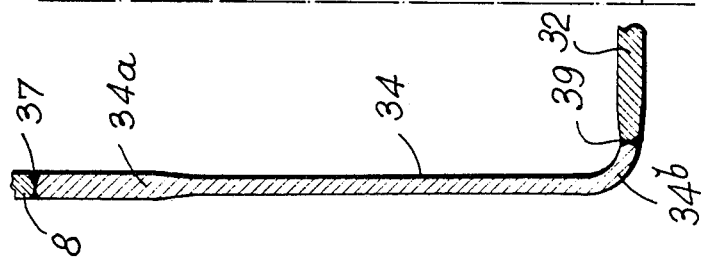

COVER PLUG OF THE CORE OF A FAST NEUTRON NUCLEAR REACTOR

FIELD OF THE INVENTION

The invention relates to the cover plug of the core of a fast neutron nuclear reactor.

BACKGROUND OF THE INVENTION

Fast neutron nuclear reactors are generally cooled with a liquid metal such as sodium and comprise a vessel closed by a horizontal, very thick slab and filled with the coolant liquid sodium in which the core of the reactor is immersed. Disposed above the core is an assembly termed a "core cover plug" which supports the sheath tubes of the control rods and the whole of the instrumentation of the core comprising in particular the tubes taking off sodium at the outlet of the assemblies and the thermocouples for measuring the temperature in the assemblies of the core. This core cover plug also ensures, by its lower part, the deflection of the stream of sodium issuing from the core to direct it to the intermediate exchangers at the periphery of the vessel.

The core cover plug is constituted by a generally cylindrical barrel having a vertical axis whose upper part is fixed to a support plate bearing on a rotating plug mounted on the slab of the reactor. The rotating plug has an opening for the passage of the cover plug of the core; the rotating plug is mounted to be rotatable about a vertical axis on the slab closing the vessel of the reactor.

The cover plug of the core also includes an group of vertical tubes of which some are adapted to receive the control rods of the reactor and others the instrumentation devices for effecting neutronic measurements and temperature measurements in the core and for taking off the sodium at the outlet of the fuel assemblies constituting the core. The lower end of the barrel of the core cover plug is located just above the upper part of the assemblies and receives a highly apertured transverse plate which is fixed to the cylindrical barrel. The openings extending through this apertured plate permit both the passage of the sodium for cooling the assemblies, and assured maintenance and guiding of the tubes receiving the control rods and of the instrumentation tubes.

Above the apertured plate, another plate which is transverse with respect to the cylindrical barrel permits the deflection and the dispersion of the sodium issuing from the core. This plate has a first group of bores in which the instrumentation tubes are fixed, a second group of bores through which extend the guide tubes of the control rods, and a few apertures for the passage of sodium to ensure an equilibrium of level and pressure between the part inside and the part outside the barrel of the core cover plug. The deflection plate therefore has, in contrast with the apertured plate, a very small total section of the passage for the sodium. The sodium is therefore laterally deviated by this plate and reaches the heat exchangers immersed in the vessel of the reactor, after having passed through the barrel of the core cover plug through a group of openings provided in this barrel.

In known and presently-used core cover plugs, the transverse deflection plate is fixed to the cylindrical barrel in such manner that these elements are subjected to very high stresses which are prejudicial to a long service life.

Indeed, the lower part of the core cover plug is subjected to extremely high stresses due to the hydrodynamic flow conditions of the sodium and to the thermal conditions prevailing in this region of the vessel of the reactor. The temperature, which corresponds to the temperature of the sodium issuing from the core, is high in this region and may undergo very rapid variations, in particular in the event of urgent shut-downs of the reactor.

SUMMARY OF THE INVENTION

An object of the invention is therefore to propose a cover plug of a core of a fast neutron nuclear reactor ensuring the fixing and the guiding of the control rods and of the instrumentation of the core and the deflection and dispersion of the coolant liquid of the reactor, comprising, in the known manner, a cylindrical barrel disposed with its axis vertical, a support plate integral with the upper part of the barrel coming to bear on a rotating plug closing the vessel of the reactor in which the core is immersed in the coolant liquid, a group of vertical tubes for receiving the control rods of the reactor, fixed in their upper part to the support plate and disposed inside the barrel in rows coaxial with said barrel, an apertured transverse plate fixed to the lower end of the barrel allowing the passage of the coolant liquid and of the vertical tubes the spacing apart of which it ensures, and at least one transverse plate for deflecting the coolant liquid on which are fixed the vertical tubes of the group which serve to effect the measurements in the core, located above the apertured plate, said core cover plug being subjected to acceptable stresses in its lower part coming in contact with the coolant liquid circulating at high temperature.

For this purpose, the transverse deflection plate is suspended from the barrel by a plurality of substantially vertical elastically yieldable metal strips evenly spaced apart at the periphery of the barrel and welded to said barrel by their upper end and to the edge of the deflection plate by their lower end in the region of openings provided in said barrel permitting a radial movement, and said deflection plate is also integral with a part of the tubes receiving control rods disposed in a single row coaxial with the barrel.

BRIEF DESCRIPTION OF THE DRAWINGS

In order that the invention may be more clearly understood, an embodiment of a cover plug according to the invention for a fast neutron nuclear reactor cooled with liquid sodium will now be described by way of example.

FIG. 2 is an enlarged view of the detail A of FIG. 1 showing a suspension strip of the deflection plate.

FIG. 3 is a sectional view taken on line III—III of FIG. 2.

DESCRIPTION OF PREFERRED EMBODIMENT

Figure 1:
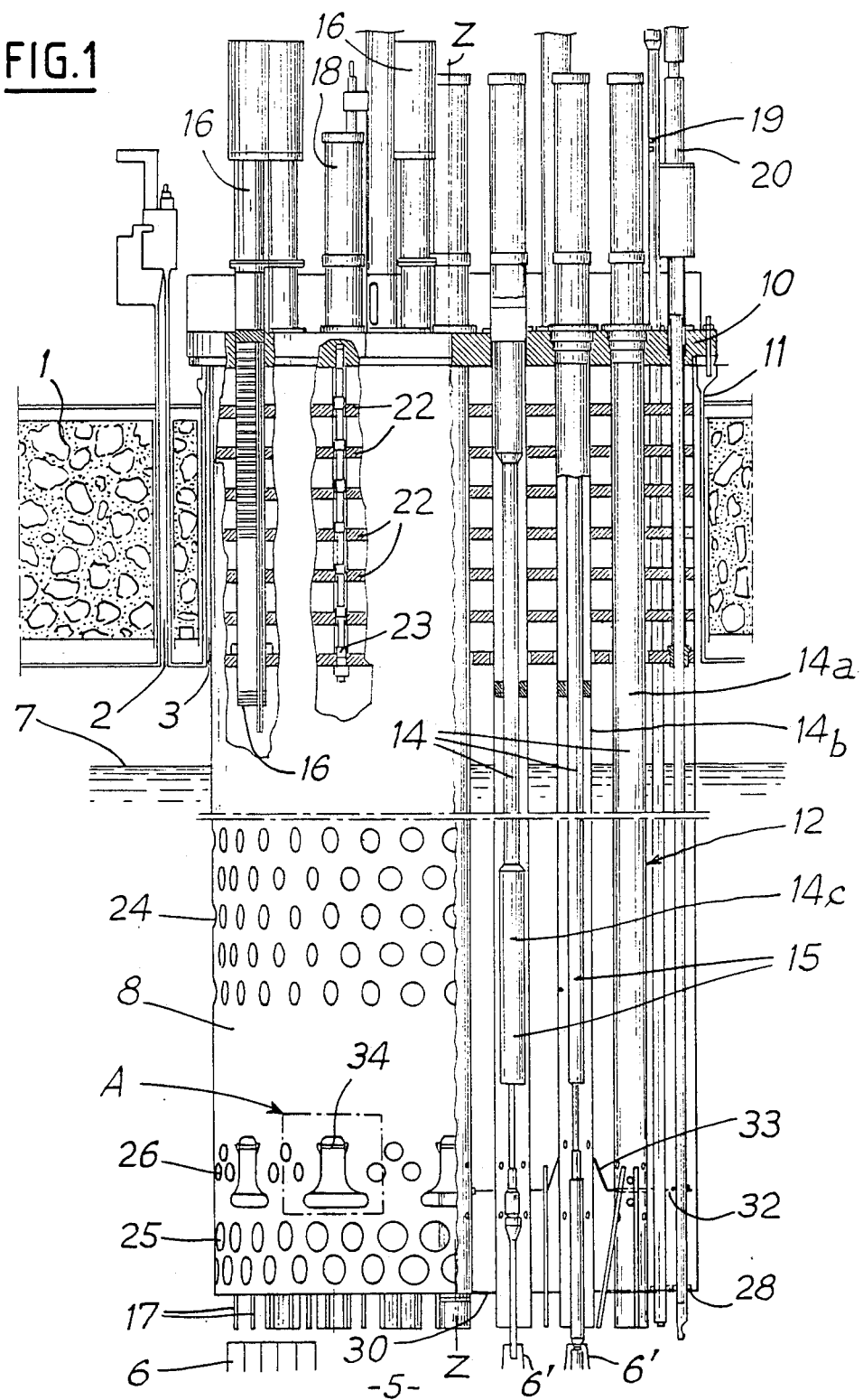
FIG. 1 is an elevational view, partly in section, of the assembly of the cover plug of the core in its operating position in the vessel of the reactor.

FIG. 1 shows a part of the rotating plugs disposed in the closing slab of the vessel of a fast neutron nuclear reactor. One of the rotating plugs, termed the small rotating plug, is mounted in an opening 2 of the other rotating plug, termed the large rotating plug.

These plugs are mounted to rotate relative to each other and relative to the slab of the reactor, about vertical axes. The small rotating plug has an opening 3 in which is mounted the cover plug of the core, generally designated by the reference numeral 4.

This core cover plug 4 is disposed vertically above the core 5 so that its lower end is just above the assembly heads 6 and spaced a short distance away from the latter.

The vessel of the nuclear reactor is filled with sodium, the upper level 7 of this liquid sodium being well above the upper level of the assembly heads 6. The core is therefore completely immersed in the liquid sodium, as is the major part of the core cover plug 4.

The cover plug comprises a cylindrical barrel 8 having a vertical axis fixed in its upper part to a support plate 10 bearing, through a sleeve 11, on the small rotating plug which is supported by the slab of the reactor, through the large rotating plug. The sleeve 11 defines the opening 3 for the passage of the core cover plug and the cylindrical barrel 8 has a diameter which is only very slightly less than the inside diameter of the support and passage sleeve 11.

The support plate 10 of very thick steel provides a biological protection against radiations vertically above the cover plug 4. This support plate 10 also carries a group of tubes 12 placed vertically inside the cylindrical barrel 8 of the cover plug 4. A large part of the group of tubes 12 is constituted by guide tubes 14 in which are shifted assemblies 15 to which are fixed the absorbent elements of the control rods of the reactor disposed in sheaths 6′ which are interposed between the assemblies of the core.

The mechanisms for shifting the control rods are located above the support plate 10 in the extension of the tubes 14.

The tubes 14 are disposed in three concentric rows having for axis the vertical axis Z—Z′ of the cover plug 4. There has been shown in FIG. 1 a guide tube 14a belonging to the outer row, a tube 14b belonging to the central part and a tube 14c belonging to the inner row.

All of the tubes 12 of the cover plug 4 also include tubes for the passage of thermocouples 16 whose upper part permits the assembly of a large number of thermocouples for connecting them to the various circuits for utilization of the temperature measurements effected. Each of the thermocouples is introduced into a thick tube 17 of small diameter which opens onto the lower part of the cover plug 4 vertically above an assembly 6 in which the temperature measurement is effected.

In the same way, the group 12 includes tubular case 18 permitting the passage of tubes of small diameter welded to the upper end of the thermocouple guide tubes 17 and through which samples of sodium at the outlet of each assembly are taken. These samples of sodium permit the determination, by the measurement of the radioactivity of the samples, of the possible presence of a sheath fracture in an assembly.

The group of tubes 12 also includes instrumentation tubes such as 19 and 20 respectively for neutronic flux measurements and a visualization of the assembly heads by means of an ultrasonic beam.

In addition to the support plate 10, the upper part of the cover plug 4 comprises a biological protection constituted by parallel plates 22 fixed by ties 23 under the support plate 10 within the thickness of the plugs 1.

The cylindrical barrel 8 of the cover plug 4 has several sets of openings 24, 25 and 26 enabling the sodium to pass through the barrel 8.

Fixed by welding to the lower end of the barrel 8 is a transverse plate 28 contained in a cross-sectional plane of the barrel 8 and provided with numerous openings in positions allowing the passage and the guiding of the end of the tubes of the group 12. The apertured plate 28 has in particular a group of openings disposed in three concentric rows allowing the passage of the guide tubes 14 receiving the control rods of the reactor. The transverse plate 28 also includes a group of apertures of small diameter for the passage of the thermocouple tubes 17 and the taking off of the sodium. Other openings extending through the plate 28 are also provided for receiving the lower part of instrumentation tubes such as 19 and 20.

The plate 28 has openings 30 for the passage of the liquid sodium issuing from the core, between the openings guiding the tubes 12. The plate 28 is therefore apertured in a very large part of its area, which may be as much as 90%.

Fixed above the apertured transverse plate 28, inside the cylindrical barrel 8 of the cover plug, is a second transverse plate 32 which is parallel to the plate 28 and which ensures the lateral deflection of the liquid sodium issuing from the core and entering the barrel 8 of the plug and the maintenance of the instrumentation tubes such as the tubes 17 which are secured to this plate. This plate has a diameter of about 4 meters and a thickness which is very small relative to its diameter, for example 0.02 m.

The plate 32 has apertures for the passage of the tubes 14.

Apart from these openings for the passage of the tubes, the plate 32 has only a few additional openings of small size for the equilibrium of the sodium level inside and outside the barrel of the core cover plug. The sodium flux issuing from the core and passing through the openings 30 in the apertured plate 28 is consequently deviated by the plate 32 which ensures the lateral deflection and the passage of the sodium flux through the openings 25 provided in the lower part of the barrel 8. The hot sodium can in this way reach the intermediate heat exchangers extending into the vessel.

The plate 32 is apertured in a much smaller part of its area than the apertured plate 28.

According to the invention, the plate 32 is connected to the barrel 8 by flexible strip devices 34 which will be described in more detail with reference to FIGS. 2 and 3.

The plate 32 is moreover fixed to the guide tubes, such as 14b disposed in the median row coaxial with the barrel 8, by small frusto-conical sleeves 33 each of which is welded (a) to the plate 32 along its large base and along an opening in the plate 32 whose diameter is substantially larger than the diameter of the tube 14b and (b) on the other hand, by its small base to the corresponding tube 14b. The other tubes, such as 14a and 14c disposed in the outer and inner rows, extend freely through openings in the plate 32, the plate 32 merely performing the function of a spacer for these tubes 14a and 14c.

The plates 28 and 32 are therefore different, in that the plate 28 is apertured in a much larger part of its area than the plate 32 and in that the plate 28 merely performs the function of a spacer for the tubes 12, whereas the instrumentation tubes and the guide tubes located in a single row are fixed to the plate 32.

Reference will now be made to FIGS. 2 and 3 for describing the flexible strips 34 suspending the deflection plate 32 inside the barrel 8 of the cover plug.

Each of the flexible strips 34 is disposed in a cut-out opening having an inverted T shape with rounded corners provided in the cylindrical barrel 8. For the suspension of the plate 32, a dozen identical cut-out openings 35 are provided evenly spaced apart on the periphery of the barrel 8 in angular positions spaced 30° apart. Fixed in each of the cut-out openings 35 is a flexible strip 34 which is of corresponding shape and has an upper portion 34a of greater thickness than the remaining portion fixed by a welded joint 37 to the cylindrical barrel 8 in a cut-out opening having an inverted U shape.

The flexible strip 34, of a grade of steel capable of being welded to the cylindrical barrel 8, is completely inserted by its inverted U-shaped upper portion 34a in the barrel 8 with which it is rigidly secured. The portion of the flexible strip 34 located below the thick part 34a is located with a relatively large clearance 36 in the cut-out opening 35. This strip 34 has a lower portion 34b which is bent toward the interior of the barrel 8 and has a width which increases from the median portion of the strip 34 to its end which is fixed by means of a welded joint 39 to the periphery of the deflection plate 32.

The lower bent and widened portion 34b of the flexible strip 34 is disposed at the level of the upper part of the widening of the inverted T-shaped cut-out opening 35.

The flexible strips 34 may therefore be free to move in the radial directions of the plate 32 and the barrel 8 by a bending of the upper portion of the strip below the junction portion 34a. The bending of the strip 34 consequently occurs in a region where the metal of the strip has not been modified by the weld 37.

The radial movement of the flexible strips 34 allows a free expansion and a free displacement of the transverse plate 32 suspended from the strips 34, in radial directions of the barrel 8.

The deflection plate 32 is moreover fixed to a single row of guide tubes 14 so that this plate 32 and the region of the barrel 8 in which it is fixed undergo only limited stresses under the effect of variations in the temperature in the sodium flux issuing from the core.

Further, the transverse plate 32 is supported with no play by the strips 34 fixed in the barrel 8.

The scope of the invention is not intended to be limited to the embodiment just described.

Thus the cut-out openings in the barrel 8 permitting the fixing of the flexible strips suspending the deflection plate 32 may have shapes different from that described. However, the described shape permits the optimization of the distribution of the stresses in the strips 34 and consequently in creases the strength and prolongs the life of the device. There may also be envisaged a lower end of the strips adapted to be fixed to the periphery of the deflection plate with a shape different from the described and illustrated shape bent at 90°.

Cut-out openings may also be envisaged which have a shape different from the U shape having rounded corners for fixing the upper portion of the strips in the cylindrical barrel. However, the cut-out openings and the corresponding strips should always have rounded corners to avoid concentration of fracture-producing stresses under the high temperature conditions of utilization of the cover plug.

In the embodiment just described, the radius of the median circular row in which the guide tubes 14b fixed to the deflection plate 32 are disposed was slightly less than one half of the radius of the cylindrical barrel 8. More generally, the radius of this row in which the tubes fixed to the deflection plate are disposed will preferably be between one-third and one-half of the radius of the cylindrical barrel.

The guide tubes may be fixed to the deflection plate by members different from the described frusto-conical sleeves. This fixing must however permit a slight relative displacement under the effect of thermal stresses between the plate and the guide tube by deformation of the connecting member.

The invention is applicable to the core cover plug of any rapid neutron nuclear reactor cooled by a liquid.

What is claimed is:

1. In a fast neutron nuclear reactor having a vessel closed by a structure comprising a rotating plug, said vessel containing a core and a coolant liquid, said nuclear reactor having control rods for movement into and out of said core, a cover plug structure for fixing and guiding the control rods and instrumentation of the core and deflecting and dispersing the coolant liquid, said cover plug structure comprising a cylindrical barrel having a vertical axis, a support plate integral with an upper part of the barrel for bearing on a rotating plug closing the vessel of the reactor in which vessel the core is immersed in the coolant liquid, a group of vertical tubes at least a part of which tubes receive control rods of the reactor, fixed in an upper part of the tubes to the support plate and disposed inside the barrel in a plurality of rows coaxial with the barrel, an apertured transverse plate fixed to a lower end of the barrel and allowing passage of the coolant liquid and the vertical tubes the spacing of which it ensures, and at least one transverse plate for deflecting the coolant liquid on which plate are fixed vertical tubes of the group which serve to effect measurements in the core, said deflecting plate the diameter of which is less than the inner diameter of the barrel being located inside the barrel above the apertured plate, the improvement wherein, for suspending the transverse deflection plate from the barrel, substantially vertical elastically yieldable strips are evenly spaced apart on the periphery of the barrel and welded to the barrel by an upper end of the strips and welded to an edge of the deflection plate by a lower end of the strips, openings being provided in the barrel in regions of the respective strips, said openings having a shape corresponding to the shape of the strips but with a slightly smaller size to allow movement of the strips outwards into the openings and of the deflection plate radially of said vertical axis, the deflection plate being integral with some of the tubes which receive control rods and are disposed in a single row coaxial with the barrel, the tubes thus ensuring the support of the deflection plate.

2. The improvement according to claim 1, wherein the openings in the barrel are cut out substantially in a shape of an inverted T and the elastically yieldable strips have a substantially corresponding inverted T shape, a widened lower portion of the strips corresponding to the transverse part of the inverted T being bent at substantially 90° toward the interior of the barrel and welded to the edge of the deflection plate, and wherein the tubes which receive control rods and are integral with the deflection plate are disposed in a circular row coaxial with the barrel and have a radius which is between one-third and one-half of the radius of the barrel.

3. The improvement according to claim 1, wherein the openings in the barrel have an upper part substantially in a shape of an inverted U with rounded corners, the strips having a portion of corresponding shape which is welded to the barrel along a contour of the inverted U shape.

4. The improvement according to claim 1, further comprising substantially frusto-conical sleeves fixing to the deflection plate the tubes which receive control rods and are integral with the deflection plate.

5. The improvement according to claim 1, wherein the deflection plate has a diameter of substantially four meters and a thickness of substantially 0.02 meter.

* * * * *